US009244988B2

(12) United States Patent
Hegde et al.

(10) Patent No.: US 9,244,988 B2
(45) Date of Patent: Jan. 26, 2016

(54) DYNAMIC RELEVANT REPORTING

(75) Inventors: Sumanth Hegde, Bangalore (IN);
Santosh V, Nagercoil (IN); Tarun Shetty, Bangalore (IN)

(73) Assignee: SAP SE, Walldorf (DE)

( * ) Notice: Subject to any disclaimer, the term of this patent is extended or adjusted under 35 U.S.C. 154(b) by 411 days.

(21) Appl. No.: 13/429,965

(22) Filed: Mar. 26, 2012

(65) Prior Publication Data

US 2013/0254224 A1  Sep. 26, 2013

(51) Int. Cl.
*G06F 17/30* (2006.01)
*G06F 7/00* (2006.01)

(52) U.S. Cl.
CPC .... *G06F 17/30569* (2013.01); *G06F 17/30592* (2013.01)

(58) Field of Classification Search
CPC .................. G06F 17/30592; G06F 17/30569
See application file for complete search history.

(56) References Cited

U.S. PATENT DOCUMENTS

| 6,480,842 | B1 * | 11/2002 | Agassi et al. | |
| 7,792,784 | B2 * | 9/2010 | Gupta | 707/602 |
| 2005/0120051 | A1 * | 6/2005 | Danner et al. | 707/104.1 |
| 2013/0073518 | A1 * | 3/2013 | Srivastava et al. | 707/607 |

FOREIGN PATENT DOCUMENTS

| EP | 1473640 | * 11/2004 | G06F 17/30 |

* cited by examiner

*Primary Examiner* — Jeffrey A Burke
(74) *Attorney, Agent, or Firm* — Kenyon & Kenyon LLP

(57) ABSTRACT

A system and method provide for an application for matching metadata from a transaction in an online transaction processing subsystem of an enterprise system to query metadata in an online analytical processing subsystem. A business object type is identified from a transaction in the online transaction subsystem using an object repository key and a corresponding data object attribute is determined from a mapping table. A new query of metadata from the online analytical processing subsystem is run, using the value of the data object attribute as a filter. This may allow for the generation of dynamic related report results for the transaction.

20 Claims, 3 Drawing Sheets

DYNAMIC RELEVANT REPORTING

BACKGROUND INFORMATION

Business enterprise systems can be broken down into two types of subsystems:

online transaction processing ("OLTP") subsystems and online analytical processing ("OLAP") subsystems. OLTP subsystems are used by organizations to carry out day to day business processes of the organization. In contrast, OLAP subsystems are used to provide decision making abilities for an organization through data analysis. SAP Business Information Warehouse™ ("SAP BW") is a type of OLAP subsystem that includes data warehouses and business intelligence ("BI") tools that allow for data reporting by storing business related data in a data warehouse and later uploading the data from a corresponding operational system ("OS"). SAP BW allows for cataloguing the data and making the data available to an end user for analytics and other business uses through model reports.

In existing OLAP subsystems, content is delivered from an OLAP subsystem using data objects that represent a type, characteristic, or attribute ("InfoObjects"). These InfoObjects can be used by the OLAP to model master data and serve as attributes in data storage structures. A query can be run by a user to find a matching InfoObject. An attribute corresponding to the InfoObject can be further analyzed to produce further attributes of the InfoObject. In these implementations however, reports generated in the OLAP subsystems and the InfoObjects themselves, cannot be linked to the business activities of the OLTP subsystem. The inability to link the relevant reports generated by the OLAP subsystem to the correct transactions in the OLTP subsystem, prevents the users from making an informed decision during the transaction itself.

Thus there remains a need in the art, for a system which allows for the mapping of data reports from OLAP subsystems to individual transactions in an OLTP subsystem. There also remains a need in the art, for mapping metadata from a transaction in a business enterprise system to query metadata in a data warehouse.

SUMMARY

A system and method are described herein that provide for an application for matching metadata from a transaction in an online transaction processing subsystem of an enterprise system to query metadata in an online analytical processing subsystem. The executed program identifies a business object type from a transaction in an online transaction subsystem using a business object repository key and looks up a corresponding InfoObject from a mapping table correlated to the business object type. The system and method further filters accumulated queries from the online analytical processing subsystem with a value of the InfoObject to generate dynamic related report results for a specific transaction.

In particular, the exemplary embodiments and/or exemplary methods are directed to a system and method for providing dynamic relevant reporting for individual transactions in an online transaction processing system. The system and method include a process in which a business object type of a selected transaction in the online transaction processing system is identified and mapped to a data object attribute, such as an InfoObject. Identification of the business object type can be made through the use of business object repository definitions. The business object type can, for example, be a business object repository key. Mapping may be done by a mapping table that is stored in a database.

After the data object attribute is identified, the system and method may identify metadata from queries in the online analytical processing system that have the data object attribute as an attribute value. This metadata may be stored in its own separate database. Further, the system and method may run a new query in the online analytical processing system using the data object attribute as a filter value. This may filter the identified metadata only to the relevant metadata that corresponds to the data object attribute, and ultimately, the selected transaction. A generated report for the specific transaction from the new query can be displayed on a user interface. The report can be displayed adjacent to a window corresponding to the online processing system, which allows a user to view the individual transaction and the generated report simultaneously.

DETAILED DESCRIPTION

The subject matter will now be described in detail for specific preferred embodiments, it being understood that these embodiments are intended only as illustrative examples and is not to be limited to these embodiments.

Traditional enterprise systems do not allow for the ability to map between analytical processing and daily business procedures and transactions of the enterprise system. Embodiments provide an application for matching metadata from a transaction in an online transaction processing subsystem of an enterprise system to query metadata in an online analytical processing subsystem. The executed program identifies a business object type from a transaction in an online transaction subsystem using an object repository key and looks up a corresponding InfoObject from a mapping table correlated to the business object type. The system and method further filters accumulated queries from the online analytical processing subsystem with a value of the InfoObject to generate dynamic related report results for a specific transaction.

Figure 1:
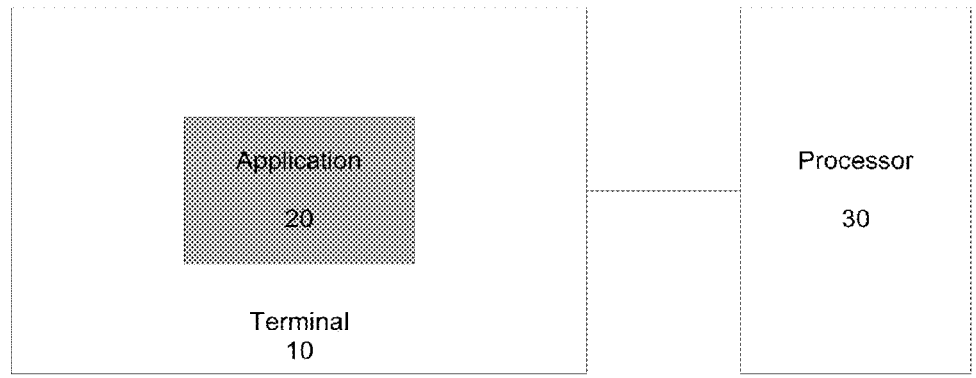
FIG. 1 is a diagram of the report modeling application during runtime according to an example embodiment.

FIG. 1 illustrates a diagram of a user terminal 10 displaying an application 20 on the terminal. Application 20 may be executed, for example, by a processor 30 and may be displayed on user terminal 10 to a user. User terminal 10, may be embodied, for example, as a desktop, laptop, hand-held device, personal digital assistant (PDA), television set-top Internet appliance, mobile telephone, smart phone, iPod™, iPhone™, iPad™, etc., or as a combination of one or more thereof, or other comparable device.

In an example embodiment, application 20 may be an application that is implemented on a back end component and displayed on a user interface 25 on user terminal 10. In another embodiment, the application may be a computer-based application stored locally and displayed on terminal 10. In another embodiment, application 20 may be an application specifically designed and operable on a hand-held device, mobile telephone, smart phone, iPod™, iPhone™, or iPad™.

In an example embodiment, the system and method may include one or more processors 30, which may be implemented using any conventional processing circuit and device or combination thereof, e.g., a central processing unit (CPU) of a personal computer (PC) or other workstation processor, to execute code provided, e.g., on a hardware computer-readable storage medium including any conventional memory device, to perform any of the methods described herein, alone or in combination. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

Figure 2:
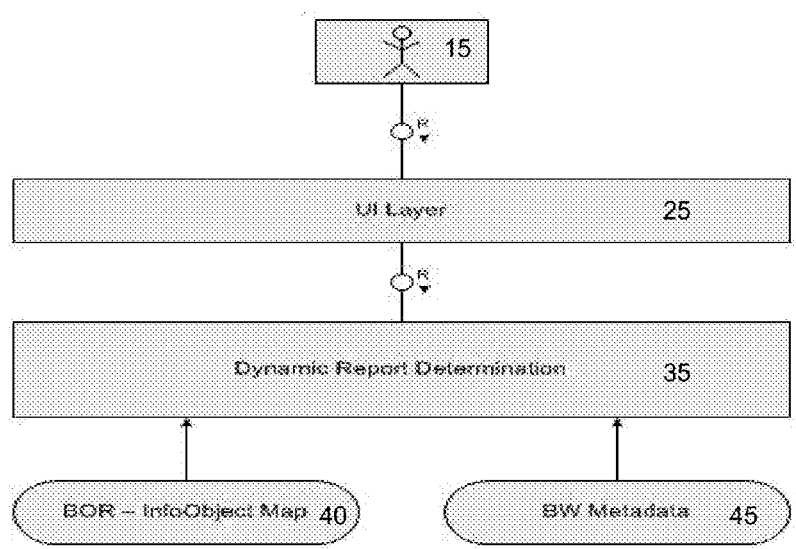
FIG. 2 is a schematic representation of the dynamic report modeling according to an example embodiment.

FIG. 2 illustrates a schematic illustration of the functionality of the dynamic report modeling process. A user 15 may connect at user terminal 10 to a user interface 25 of application 20. Connection to user interface 25 can be made through a representative state transfer ("REST") interface or other means of connectivity. The user interface 25 of application 20 may connect to a back end component 35 that may assist in dynamic report determination. Connection to component 35 may also be made through a REST interface or alternate means of connectivity.

Component 35 may receive data transmitted from databases 40 and 45. In an online transaction processing subsystem, each transaction may contain a unique business object repository ("BOR") key that identifies each unique transaction. Database 40 may include a mapping table correlating each unique BOR key to an InfoObject, a data object that may represent an attribute or characteristic of the transaction data. The InfoObject may be of a type characteristic, key figure, or time dimension. The mapping table in database 40 may use standard BOR definitions to map the BOR keys to the InfoObjects. Component 35 may transmit information related to each transaction in an OLTP subsystem to database 40, including a specific BOR key. Using the BOR/InfoObject map, database 40 may transmit a corresponding InfoObject back to component 35.

Database 45 may transmit metadata from queries performed in a data construct of the OLAP subsystem to component 35. These queries may contain characteristics and key figures used for analysis and may be built in the data construct, known as an InfoProvider, of the OLAP subsystem. In an embodiment, the InfoProvider may be optimized for data storage to enable faster and more flexible reporting.

Figure 3:
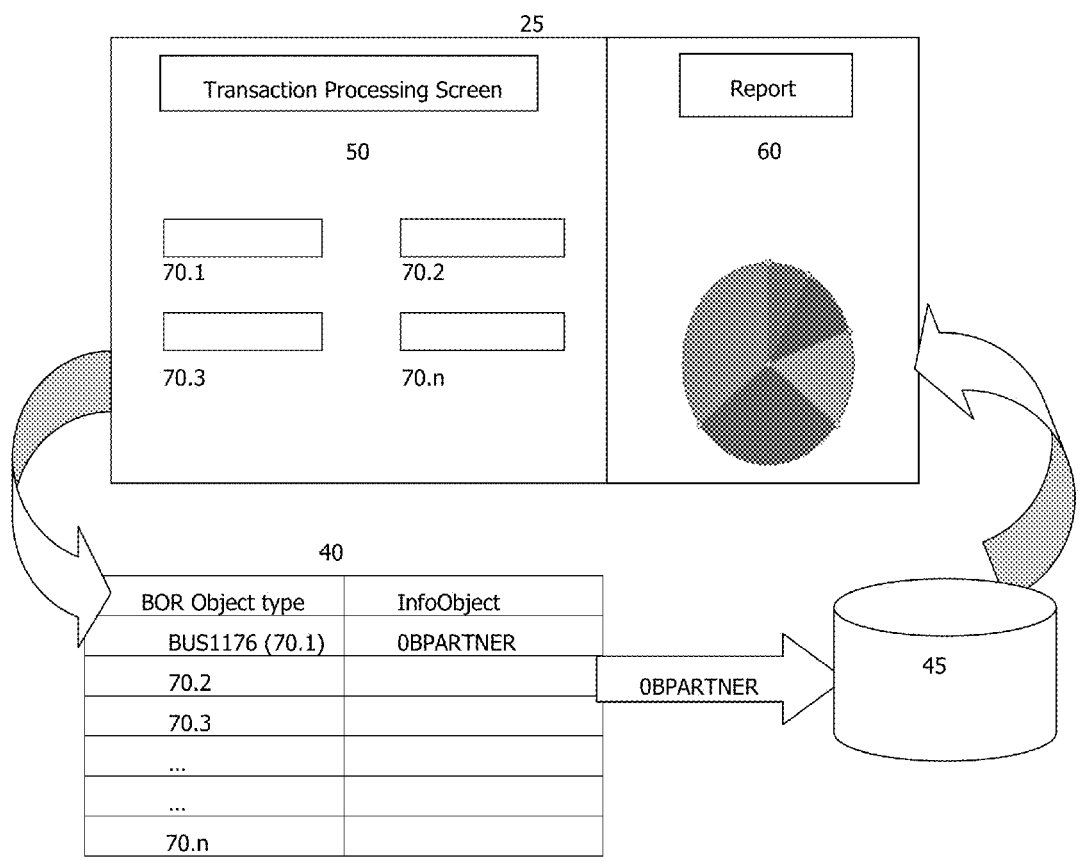
FIG. 3 is an interface of the transaction processing system and model report generator according to an example embodiment.

FIG. 3 illustrates an interface of the transaction processing system and model report generator according to an embodiment. The interface in FIG. 3 may pertain, for example, to a sales environment as illustrated in the figure. An online transaction processing window 50 may be displayed on user interface 25 on user terminal 10 displaying information pertaining to the OLTP subsystem. In an embodiment, the OLTP may, for example, be an Enterprise Resource Planning™ ("ERP") application. In another embodiment, the OLTP may, for example, be a Customer Relationship Management™ ("CRM") application.

Model report 60 may also be displayed on a viewing pane on user interface 25, adjacent to OLTP window 50. OLTP window 50 may display a plurality of transactions 70.1-70.n performed by the OLTP subsystem. These transactions may be displayed in a plurality of input fields. Each of the plurality of transactions may be identified by an object type or BOR key. A specific transaction 70.1-70.n may be selected from a transaction list. The business object type or BOR key of this specific transaction may be indentified using BOR definitions. The object type may be transmitted to database 40.

Database 40, which may store a mapping table linking object types with data objects attributes or characteristics, such as InfoObjects, may receive the object type for the list transaction. The system may search the mapping table in database 40 for the object type. The mapping table, as illustrated in FIG. 3, may, for example, contain a column pertaining to a "BOR Object type" and a column pertaining to an "InfoObject". If the object type or BOR key is found in the mapping table, the object type may be mapped to a respective InfoObject. The correlated data object attribute or InfoObject may be determined in database 40.

The identified InfoObject may be transmitted to database 45. In the example embodiment illustrated in FIG. 3, transaction 70.1 may be identified. In this example, transaction 70.1 may have an object type determined to be "BUS1176". The object type "BUS1176" may be transmitted by the system to database 40. The system may use the mapping table in database 40 to find an InfoObject that corresponds to the object type "BUS1176". In the example embodiment in FIG. 3, an InfoObject "08Partner" may be identified from the mapping table in database 40 as the InfoObject correlating to the object type "BUS1176".

After the data object attribute or InfoObject corresponding to a transaction object type has been identified, the attribute or InfoObject may be transmitted to database 45. Database 45 may store metadata for all queries in the OLAP subsystem. The system may use the identified InfoObject to determine the queries in database 45 that have the InfoObject as an attribute. A query of the OLAP subsystem may be run with the InfoObject used as a filter. The InfoObject may be entered as a specific transaction value in a query of the OLAP subsystem. The results from this filtered query may be transmitted for display on model report viewing pane 60, which may display the generated report on user interface 25. Model report viewing pane 60 may display the filtered results in a numerical, graphical, or pictorial representation. Model report 60 may be displayed in a viewing pane in user interface 25 that is adjacent to OLTP window 50. This may allow for a user to view a generated report simultaneously with the specific transaction.

Figure 4:
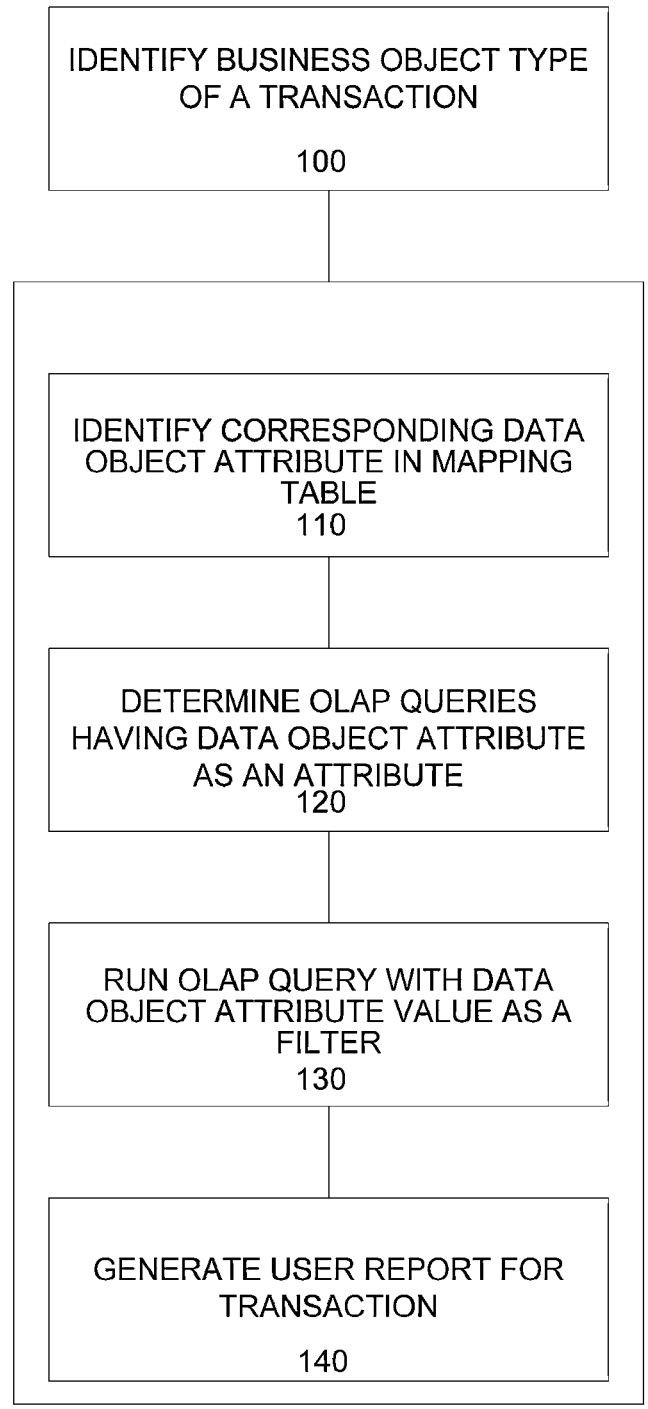
FIG. 4 is a diagram of the process of the dynamic report modeling according to an example embodiment.

FIG. 4 illustrates a diagram of the process of the dynamic report modeling according to an embodiment. In step 100, a business object type may be identified for a specific transaction 70.1-70.n in the OLTP window 50. The business object type may be determined by using stored BOR definitions that may identify a transaction with a determined object type or BOR key. In step 110, the determined business object type is looked up in a mapping table stored in database 40. This mapping table may contain a list of object types and specifically associated data object attributes, such as InfoObjects. The system may identify a data object attribute from the mapping table and move to step 120.

In step 120, the system may look up metadata for the OLAP subsystem. This metadata may be stored for example, in database 45. The system may parse through all the queries in the OLAP metadata to identify queries which may include the identified data object attribute as an attribute, and move to step 130. In step 130, a new query of the OLAP subsystem may be run by using the data object attribute as a filter. This may be achieved, for example, by entering the data object attribute as an input value in the query. The generated results from the filtered query may be output to a viewing pane 60 in a user interface 25. These results may be displayed simultaneously and adjacent to the selected transaction 70.1-70.n in OLTP window in step 140.

Several embodiments are specifically illustrated and/or described herein. However, it will be appreciated that modifications and variations are covered by the above teachings and within the purview of the appended claims without departing from the spirit and intended scope of the matter above.

What is claimed is:

1. A method for providing dynamic relevant reporting for transactions in an online transaction processing system, the method comprising:
   identifying a business object type of a transaction in the online transaction processing system;
   mapping the business object type to a data object attribute;
   determining which queries in an online analytical processing system include the data object attribute as an attribute of the respective query's metadata, wherein the queries in the metadata of the online analytical processing system are parsed to identify the queries which include the identified data object attribute as an attribute;
   running at least one new query in the online analytical processing system with the data object attribute as a filter value, wherein the at least one new query corresponds to at least one of the queries determined to include the data object attribute; and
   displaying a generated report for the transaction from the at least one new query.

2. The method according to claim 1, wherein the business object type is identified through business object repository definitions.

3. The method according to claim 1, wherein the business object type is a business object repository key.

4. The method according to claim 1, wherein the mapping of the business object type is done by a mapping table stored in a database.

5. The method according to claim 1, wherein the metadata is stored in a database for the online analytical processing system.

6. The method according to claim 1, wherein the generated report is displayed in a user interface of an application.

7. The method according to claim 6, wherein the generated report is displayed adjacent to the online transaction processing system.

8. A dynamic relevant reporting system for transactions in an online transaction processing subsystem, the system comprising:
   at least one user terminal displaying a user interface, the online transaction processing subsystem displayed on the user interface;
   a database storing a mapping table; and
   a processor operable to:
      identify a business object type of a transaction in the online transaction processing subsystem;
      map the business object type to a data object attribute in the mapping table stored in the database;
      determine which queries stored in a database for an online analytical processing system include the data object attribute as an attribute of the respective query's metadata, wherein the queries in the metadata of the online analytical processing system are parsed to identify the queries which include the identified data object attribute as an attribute;
      run at least one new query in the online analytical processing system with the data object attribute as a filter value, wherein the at least one new query corresponds to at least one of the queries determined to include the data object attribute; and
      display a generated report for the transaction from the at least one new query on the user interface.

9. The system according to claim 8, wherein the business object type is identified by the processor through business object repository definitions.

10. The system according to claim 8, wherein the business object type is a business object repository key.

11. The system according to claim 8, further comprising:
   a separate database for the online analytical processing system for storing metadata from queries.

12. The method according to claim 8, wherein the generated report is displayed adjacent to the online transaction processing system on the user interface.

13. A non-transitory computer readable medium having a computer program which is executable by a processor for providing dynamic relevant reporting for transactions in an online transaction processing system, the computer readable medium comprising:
   an arrangement providing the following:
      identifying a business object type of a transaction in the online transaction processing system;
      mapping the business object type to a data object attribute;
      determining which queries in an online analytical processing system include the data object attribute as an attribute of the respective query's metadata, wherein the queries in the metadata of the online analytical processing system are parsed to identify the queries which include the identified data object attribute as an attribute;
      running at least one new query in the online analytical processing system with the data object attribute as a filter value, wherein the at least one new query corresponds to at least one of the queries determined to include the data object attribute; and
      displaying a generated report for the transaction from the at least one new query.

14. The computer readable medium according to claim 13, wherein the business object type is identified through business object repository definitions.

15. The computer readable medium according to claim 13, wherein the business object type is a business object repository key.

16. The computer readable medium according to claim 13, wherein the mapping of the business object type is done by a mapping table stored in an additional arrangement.

17. The computer readable medium according to claim 13, wherein the metadata is stored in an additional arrangement.

18. The computer readable medium according to claim 13, wherein the generated report is displayed by the computer program on a user interface.

19. The computer readable medium according to claim 18, wherein the generated report is displayed adjacent to the online transaction processing system.

20. A method for providing dynamic relevant reporting for transactions in an online transaction processing system, the method comprising:
   identifying a business object repository key of a transaction in the online transaction processing system;
   classifying the business object repository key to a type;
   mapping the business object repository type to an infoObject;
   determining which queries in an online analytical processing system include the infoObject as an attribute of the respective query's metadata, wherein the queries in the metadata of the online analytical processing system are parsed to identify the queries which include the identified infoObject as an attribute;

running at least one new query in the online analytical processing system with the infoObject as a filter value, wherein the at least one new query corresponds to at least one of the queries determined to include the data object attribute; and displaying a generated report for the transaction from the at least one new query.

\* \* \* \* \*